Patented Mar. 9, 1943

2,313,154

UNITED STATES PATENT OFFICE 2,313,154

PREPARATION OF RUBBER COMPOSITIONS

John H. Kelly, Jr., and Milton M. Stern, Chicago, Ill., assignors to Dryden Rubber Company, Chicago, Ill., a corporation of Illinois No Drawing. Application October 6, 1939,
Serial No. 298,244

15 Claims. (Cl. 260—722)

The invention relates to the preparation of rubber compositions and has for its principal object the preparation of rubber compositions particularly adapted for the production of sponge or cellular rubber. The invention includes the preparation of sponge or cellular rubber products.

I have discovered that the addition of cationic soaps to rubber on the mixing rolls assists mill mobility and plasticity and in addition permits the even distribution of water throughout the rubber particularly in the presence of acidic materials. When vulcanizing agents are present this composition may be cured into a sponge or cellular rubber, the water in the rubber acting as an inflating agent in such a manner as to create a finished product of most uniform cell structure.

The process of producing sponge or cellular rubber consists essentially of intimately mixing a long chain cation active material and water with a vulcanizable rubber composition and curing the composition so produced in such a manner that the water acts as an inflating agent. Preferably an acid or acidic substance is also added to the rubber composition.

The rubber which I prefer to use in the process of making sponge or cellular rubber is regenerated vulcanized rubber commonly called "reclaimed" rubber. Acid, neutral or alkali reclaim all give good results. Other types of rubber may also be used including smoked sheet, crepe, and powdered rubber.

As long chain cation active materials are contemplated, particularly the cationic soaps. The cationic soap compounds consists essentially of a long chain aliphatic residue attached to a radical capable of ionizing in a solution in such a way that a positive charge is assumed by the long chain structure of the molecule. The chain may consist of any hydrocarbon structure over eight carbon units and preferably those from twelve. This chain structure may exist as aryl-alkyl, alkyl-aryl-alkyl or alkyl-alkyl combinations which, contrary to ordinary anionic soap or soaplike compounds, results in assuming a positive charge in aqueous solutions when having a hydrophilic negative head such as sulphonium, phosphonium, halogen, etc. As examples of typical suitable compounds are stearyl trimethyl ammonium bromide, lauryl trimethyl ammonium bromide, cetyl pyridinium bromide, cetyl dimethyl sulfonium methyl sulfate, cetyl tetramethyl ammonium bromide, dodecyldimethyl ammonium methyl sulfate, phenyl benzyl dimethyl ammonium chloride, the reaction product of diethanolamine oleate and dimethyl sulfate, the cetyl and betaine multivalent nitrogen complex and similar types. Irrespective of the negative head group, i. e., halogen, phosphonium or sulfonium, etc., all have similar characteristics in having an alkyl, aryl-alkyl or alkyl-alkyl rubber soluble chain portion and water soluble properties conferred by the terminal grouping.

As acids may be used acetic, propionic, formic and other acids of the fatty series, saturated dibasic acids such as oxalic, malonic and succinic, and even other types such as sulphuric, hydrochloric, trichloracetic, etc., or else the halogen substitution products of the monobasic acid series. Ketonic acids such as pyroracemic acid or aceto-acetic acid are similarly utilizable with cationic soaps or cation active material.

In place of the above mentioned acids, there may be utilized certain acidic substances having sufficiently high acidity to permit easy miscibility with the reclaim-cationic soap mixture. By "acidity" is meant both the ionization of certain constituents of the material and the reactivity of some of these constituents. A typical instance of a substance suitable for the purpose of my invention is waste sulphite liquid from paper manufacturing processes. This sulphite waste may be treated or not with neutralizing agents as desired. Preferably it is concentrated to 50% solids by evaporation processes. As a typical example, a waste sulphite liquor having the following characteristics is selected:

| | Per cent by weight |
|---|---|
| Twaddell | 54.5 |
| Total solids | 52.66 |
| Soluble solids | 52.51 |
| Insolubles | 0.15 |
| Nontannins | 28.62 |
| Tannin | 23.89 |
| Ash | 4.36 |

This liquor usually ranges in pH between 1.5 to 2.5 and its components are believed to consist of lignone sulphonic acids, sulfurous acid, reducing sugars and various other materials such as terpenes, aromatics and soluble cellulose.

While the use of acid in conjunction with a cationic soap is not necessary it is preferable in order to obtain good plasticization. If acids such as glacial acetic acid, oxalic acid, etc., are used in connection with the cationic soaps, a very strong plasticising effect is noticed; and if milling operation is conducted at sufficiently high temperatures, the plasticization is extremely rapid and the usual odor from hot acetic acid is quickly eliminated. The reaction is not fully understood at present, but it is believed to be the reaction of acid with protein in the presence of a cationic soap.

I do not desire to be limited to any theory as to the action of the cationic soaps in my process. However, apparently what happens is that when water and a cationic soap and preferably an acid are added to rubber (either crude or reclaimed) and the composition milled sufficiently long to obtain intimate blending, a product is obtained having water intimately distributed throughout the protein structure of the rubber and also carried to some extent into the hydrocarbon portion of the globule. A thorough assimilation and absorption is evident, owing to the positive charges inherent in the cationic soap, acid and acidified amphoteric colloid or sulphite liquor, which seem to be compatible with the "coagulated" protein and are more or less quickly blended on the mill.

To more clearly set forth the practice in accordance with the invention and to more specifically point out the nature of the product and process contemplated thereby, several specific, illustrative examples are hereinafter set forth, it being understood that these examples illustrate several embodiments which have given satisfactory results and are not intended to restrict the invention thereto.

*Example 1*

A composition suitable for the production of cellular rubber and illustrating the use of a cationic soap and acid is given below:

| | |
|---|---|
| Soft tube reclaim | 100 |
| Zinc oxide | 5 |
| Sulfur | 3 |
| Stearic acid | 1 |
| 35% aqueous solution stearyl trimethyl ammonium bromide | 10 |
| Glacial acetic acid | 2 |

The reclaim is milled with the stearic acid, zinc oxide and sulfur. The cationic soap solution is gradually added, and lastly the acid. This compound, subjected to the usual press curing procedure—25 minutes at 70 lbs.—results in a light weight sponge product having an evenly distributed cellular structure. According to the milling technique employed, whether on hot or cold rolls, and to amount of compound on mill, densities of from .115 to .22 ounce per cubic inch are attained.

*Example 2*

A composition suitable for the production of cellular rubber and illustrating the use of waste sulphite liquor is given below:

| | |
|---|---|
| Soft tube reclaim | 100 |
| Zinc oxide | 5 |
| Sulfur | 3 |
| Stearic acid | 1 |
| 35% aqueous solution stearyl trimethyl ammonium bromide | 5 |
| 50% aqueous solution waste sulphite liquor | 25 |

Milled and compounded as in the previous example, press cured samples similarly result in densities of .110 to .220 ounce per cubic inch. This stock is much more plastic and gives better flow behavior on mills and in molds.

Increasing the sulphite content to 100% on the reclaim results in extremely plastic masses which, despite their excessive "tack" and general mushy condition, give excellent sponge-like products. Reducing the sulphite waste liquor to as low as 6¼ parts still evidences a pronounced increase in plasticity.

By properly balancing the ratios of waste sulphite liquor to cationic soap and reclaim, densities as low as 0.075 to 0.085 ounce per cubic inch are obtained.

The composition and procedure given below in Example 3 give cellular rubber of increased plasticity:

*Example 3*

| | |
|---|---|
| Soft tube reclaim | 100 |
| Zinc oxide | 5 |
| Sulfur | 3 |
| Stearic acid | 1 |
| Light mineral oil | 5 |
| 35% aqueous solution stearyl trimethyl ammonium bromide | 5 |
| 11% aqueous oxalic acid solution | 13.5 |
| Glacial acetic acid | 2 |

In this example the reclaim is placed on hot mill rolls heated to 205°–215° F. by means of steam. The reclaim is milled until knitting well and the cationic soap added, followed in succession by the oxalic acid solution and then the glacial acetic acid. Thereupon the stock is removed, using a doctor blade if necessary, and permitted to cool and age for some hours. The compound is again placed on the rolls, the zinc oxide, sulfur and stearic added, and then a little water if necessary. Press-cured samples gave similar low densities as in the foregoing, but with evidence of increased flow behavior.

The reclaim used in Examples 1, 2 and 3 was an alkali reclaim having a plasticity of 50 on the Mooney plastometer, and a specific gravity of 1.16. Its rubber content was 64.8%, acetone extract 6.39 and ash 26.71. It is to be understood, of course, that other types of reclaim may be used for the production of cellular rubber by this invention. Other types of rubber may also be used, including smoked sheet, crepe and powdered rubber.

The following examples illustrate the use of crude rubber:

*Example 4*

The following example illustrates the use of cationic soaps with smoked sheets for producing cellular rubber:

| | A | B | C | D |
|---|---|---|---|---|
| Smoked sheet rubber | 100 | 100 | 100 | 100 |
| Zinc oxide | 5 | 5 | 5 | 5 |
| Stearic acid | 1 | 1 | 1 | 1 |
| Sulfur | 5 | 5 | 5 | 5 |
| 35% aqueous solution of stearyl trimethyl ammonium bromide | 10 | 10 | 10 | 10 |
| Waste sulphite liquor | 25 | 10 | 10 | |
| Oxalic acid | | | | 3 |
| Acetic acid | | | | 4 |
| Captax (mercapto benzothiazole) | 1 | | | |
| Altax (benzyl thiazyl disulphide) | | | .1 | .25 |
| Water | | 10 | 10 | 27 |

The above materials were compounded on the mill as follows: the rubber was first milled twenty minutes to cause thorough break-down and then compounded with zinc oxide and stearic acid followed by the addition of cationic soap. When the last of the cationic soap was added sulfur was then mixed in unless sulphite waste liquor was to be mixed, in which case the sulfur was blended in last.

Example 5

The following formula was compounded and illustrates the use of crepe rubber:

| | |
|---|---|
| Crepe rubber (20 minute breakdown) | 100 |
| Zinc oxide | 5 |
| Stearic acid | 1 |
| Sulfur | 5 |
| 35% aqueous solution of stearyl trimethyl ammonium bromide | 20 |
| Water | 5 |

The above formula was compounded as follows: the rubber, zinc oxide and stearic acid were blended by milling and then the cationic soap added, followed by the water. The sulfur was added last.

The following formula was compounded in the same manner as for Example 5. It illustrates the use of rubber powder.

Example 6

| | |
|---|---|
| Rubber powder (made as disclosed in U. S. Patent No. 2,019,005) | 100 |
| Zinc oxide | 5 |
| Stearic acid | 1 |
| Sulfur | 5 |
| 35% aqueous solution of stearyl trimethyl ammonium bromide | 10 |
| Water | 5 |

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible, in view of the prior art.

We claim:

1. The method of preparing a rubber composition which comprises milling rubber with a cation active material and water.

2. The method of preparing a rubber composition which comprises milling rubber with a cation active material, water and an acid.

3. The method of preparing a rubber composition which comprises milling rubber with a cation active material and sulphite liquor.

4. The method of preparing a rubber composition which comprises milling a regenerated vulcanized rubber with a cation active material and water.

5. The method of preparing a rubber composition which comprises milling a regenerated vulcanized rubber with a cation active material, water and an acid.

6. The method of preparing a rubber composition which comprises milling a regenerated vulcanized rubber with cation active material and sulphite liquor.

7. The method of preparing a sponge or cellular rubber which comprises subjecting a plastic curable mass comprising rubber, sulfur, water and a cation active material to heat sufficient to cure the mass and vaporize the water.

8. The method of preparing a sponge or cellular rubber which comprises subjecting a plastic curable mass comprising rubber, sulfur, water, cation active material and an acid, to heat sufficient to cure the mass and vaporize the water.

9. The method of preparing a sponge or cellular rubber which comprises subjecting a plastic curable mass comprising rubber, sulfur, cation active material and sulphite liquor to heat sufficient to cure the mass and vaporize the liquor.

10. The method of preparing a sponge or cellular rubber which comprises subjecting a plastic curable mass comprising regenerated vulcanized rubber, sulfur, water and a cation active material to heat sufficient to cure the mass and vaporize the water.

11. The method of preparing a sponge or cellular rubber which comprises subjecting a plastic curable mass comprising regenerated vulcanized rubber, sulfur, water, cation active material and an acid, to heat sufficient to cure the mass and vaporize the water.

12. The method of preparing a sponge or cellular rubber which comprises subjecting a plastic curable mass comprising regenerated vulcanized rubber, sulfur, cation active material and sulphite liquor to heat sufficient to cure the mass and vaporize the liquor.

13. A rubber composition comprising rubber, cation active material, water and an acid.

14. A rubber composition comprising regenerated vulcanized rubber, water, a cation active material and an acid.

15. A sponge rubber product of uniform cell structure containing a cation active material uniformly distributed throughout the rubber.

JOHN H. KELLY, JR.
MILTON M. STERN.